US012746557B2

(12) United States Patent
Chen

(10) Patent No.: US 12,746,557 B2
(45) Date of Patent: Sep. 29, 2026

(54) EMBEDDED CAROUSEL AMBIENT LIGHT SHOWER

(71) Applicant: Zhanlan Chen, Kaiping City (CN)

(72) Inventor: Zhanlan Chen, Kaiping City (CN)

( * ) Notice: Subject to any disclaimer, the term of this patent is extended or adjusted under 35 U.S.C. 154(b) by 255 days.

(21) Appl. No.: 18/475,253

(22) Filed: Sep. 27, 2023

(65) Prior Publication Data

US 2025/0058334 A1 Feb. 20, 2025

(30) Foreign Application Priority Data

Aug. 15, 2023 (CN) ......................... 202322203968.1

(51) Int. Cl.
*B05B 1/18* (2006.01)
*F21V 33/00* (2006.01)
*F21Y 115/10* (2016.01)

(52) U.S. Cl.
CPC ............ *B05B 1/185* (2013.01); *F21V 33/004* (2013.01); *F21Y 2115/10* (2016.08)

(58) Field of Classification Search
CPC ......... B05B 1/185; B05B 1/18; F21V 33/004; F21Y 2115/10; F21S 8/00
See application file for complete search history.

(56) References Cited

U.S. PATENT DOCUMENTS

2018/0306430 A1* 10/2018 Weaver ................... F21S 9/046
2021/0048160 A1* 2/2021 Wang ...................... B05B 1/185

FOREIGN PATENT DOCUMENTS

CN 110227613 A * 9/2019 ............... B05B 1/18
CN 110535247 A * 12/2019 .............. H02J 50/10
KR 102058024 B1 * 12/2019 ............ F21V 33/004

* cited by examiner

*Primary Examiner* — Qingzhang Zhou
(74) *Attorney, Agent, or Firm* — Daniel M. Cohn; Howard M. Cohn

(57) ABSTRACT

An embedded carousel ambient lighting shower head, characterized by: including a ceiling frame, lamp body, LED strip, shower head main body and water outlet panel; The ceiling frame includes a cylindrical body with an upper and lower opening, a top ring seat board, and evenly distributed fixed seat boards; The lamp body includes a downwardly open annular lamp shell and an annular translucent lamp cover, the lamp shell is made of aluminum material; The annular LED strip is placed on the top plate of the lamp shell, and the lamp body is embedded in the lower part of the cylindrical body; The shower head main body is embedded in the center hole of the lamp body and cooperates with the fixed seat board to stop; The long screw passes through the corner of the shower head main body and screw into the fixed seat board; The short screw passes through the water outlet panel and screw into the shower head main body.

6 Claims, 4 Drawing Sheets

EMBEDDED CAROUSEL AMBIENT LIGHT SHOWER

TECHNICAL FIELD

This utility application relates to an embedded carousel ambient light shower.

BACKGROUND

In the current technology, Chinese Patent No. 2016207673844, a light shower, includes a shower main body, an LED light strip and optical components for emitting light emitted by the LED light strip. The upper end of the shower body forms a water inlet end, and the lower end of the shower body forms a water outlet end; the optical component is fixed at the lower end of the shower body, the optical component includes a reflection plate and a transparent plate arranged in order from top to bottom; the LED light strip is wrapped around the outer periphery of the shower body and is fixedly connected with the shower body, forming a light transmission gap between the LED light strip and the outer periphery of the shower body; this light transmission gap is used to guide the light emitted by the LED light strip to the transparent plate. The existing problem is poor heat dissipation performance, and small light area.

SUMMARY

The purpose of this utility model is to provide an embedded carousel ambient light shower, which has good heat dissipation performance and large light area.

The utility model is implemented as follows: an embedded carousel atmosphere light shower, which is characterized by the inclusion of a ceiling frame, lamp body, circular LED strip, shower head main body, and a water outlet panel.

The ceiling frame includes a cylindrical body with upper and lower openings, a top ring seat board, and evenly distributed fixed seat boards.

The lamp body includes a downward-opening ring-shaped lamp shell and a ring-shaped translucent lamp cover, with the lamp shell made of aluminum material.

The ring-shaped LED strip is placed on the top plate of the lamp shell, with the lamp body embedded within the lower part of the cylindrical body. The shower head main body is inserted into the central hole of the lamp body and is positioned in coordination with the fixed seat board. A long screw passes through the corner of the shower head main body and screws into the fixed seat board, while a short screw passes through the water outlet panel and screws into the shower head main body.

Preferably, the edge of the water outlet panel supports the inner side of the bottom surface of the lamp body.

Preferably, the ring-shaped LED strip is a 64-color LED strip.

Preferably, the circumferential wall panel of the cylindrical body is equipped with heat dissipation holes.

Preferably, the top ring seat board is equipped with connection holes, and the top plate of the lamp shell has screw holes; screws pass through the connection holes and screw into the screw holes.

Preferably, the shower head main body includes a top plate, water spray piece, and a fixed panel.

The top plate is equipped with a water inlet interface.

The water spray component includes a square cavity with an upper opening and a spray nozzle located on the bottom plate, and the fixed panel has a nozzle hole.

The water outlet panel is equipped with a nozzle hole.

The top plate, water spray piece, and fixed panel are overlaid and fixed, with the top plate covering the upper opening of the annular water chamber to form a sealed water inlet chamber. The water outlet panel fits with the fixed panel, where the long screws pass through the fixed panel, square cavity, and top plate, while the short screws pass through the water outlet panel, fixed board, water spray piece and screw into the top plate.

Preferably, the ceiling frame is square, the corner of the top ring seat board has a reinforcing plate, and there are hanging rope connection holes on the reinforcing plate.

Preferably, the ceiling frame is square and the fixed seat board is located at the corner.

The shower head main body and the water outlet panel are square, while the lamp body is square ring-shaped.

Preferably, the suspended ceiling framework, shower head main body, and water outlet panel are circular, while the lamp body is circular ring-shaped.

The present utility model provides an embedded running horse atmosphere light shower, the lamp shell is made of aluminum material, the suspended ceiling frame has an upper opening, which improves the heat dissipation performance of the LED and extends its service life; the LED light strip color rotation creates a good bathing atmosphere.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
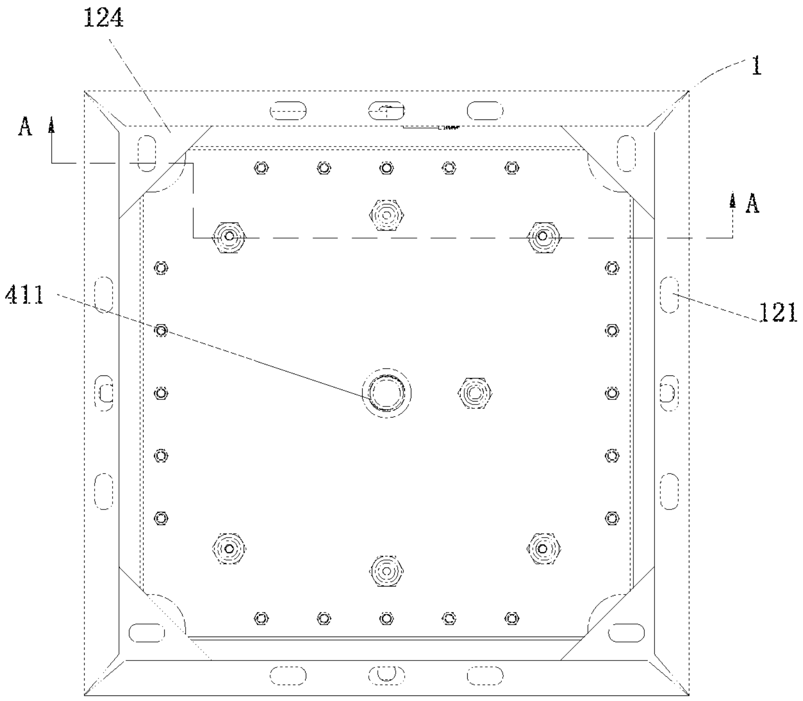
FIG. 1 is a top view of the present utility model.
Figure 2:
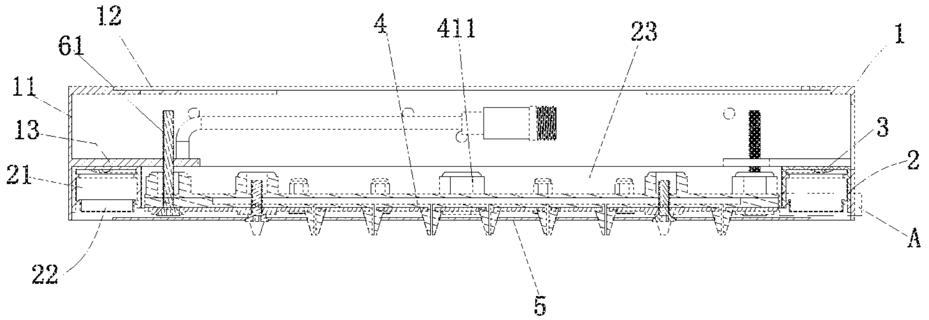
FIG. 2 is the A-A view of FIG. 1.

The following describes in detail the embodiments of the present utility model. The examples of these embodiments are shown in the accompanying drawings, where similar or identical reference numerals represent components with identical or similar functions throughout. The implementation examples described with reference to the accompanying drawings are illustrative and are only used to explain this utility model, and should not be understood as limiting the scope of this utility model.

In the description of this utility model, it should be noted that, unless otherwise expressly specified or limited, the terms “mounted,” “connected,” and “connection” should be broadly interpreted. For example, they could refer to fixed connections, removable connections, or integral connections; they could mean directly connected, or indirectly connected through an intermediate medium, and they might be a communication within two components. Those skilled in the art can understand the specific meanings of these terms in this utility model based on the specific circumstances.

As shown in FIG. 1, an embedded running horse atmosphere light shower includes a suspended ceiling frame 1, lamp body 2, circular LED light strip 3, shower head main body 4, and water outlet panel 5.

The suspended ceiling frame 1 includes a tubular body 11 with upper and lower openings, a top ring seat plate 12, and evenly distributed fixing seat plates 13. The tubular body 11 is square, the fixing seat plates 13 are located in the corner parts of the tubular body 11 and are fixed to the adjacent wall plates, and the fixing seat plates have screw holes; or the tubular body 11 is cylindrical, and the fixing seat plates 13 are evenly distributed inside the tubular body 11.

Figure 3:
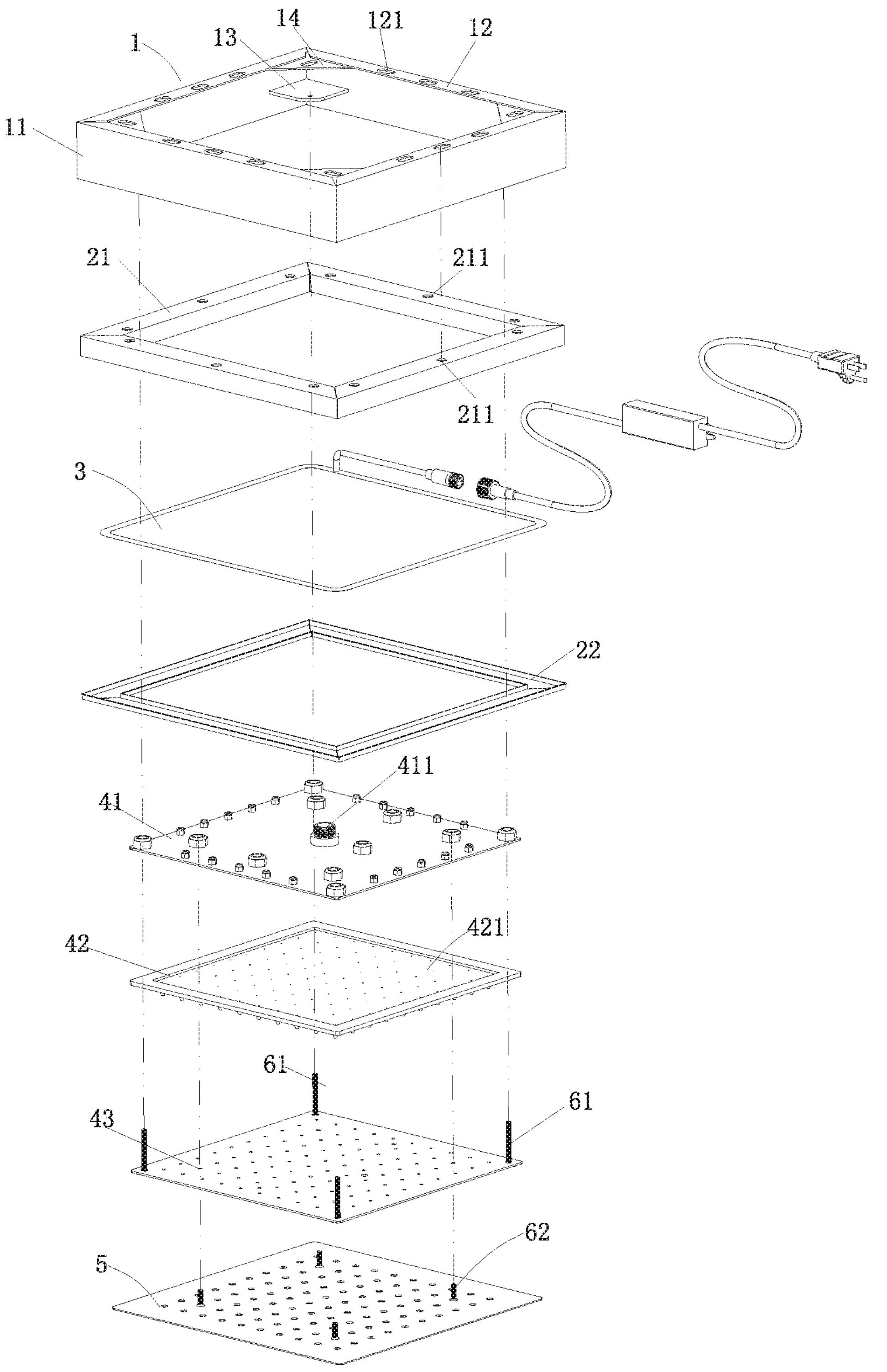
FIG. 3 is one of the stereoscopic exploded views of the present utility model.
Figure 4:
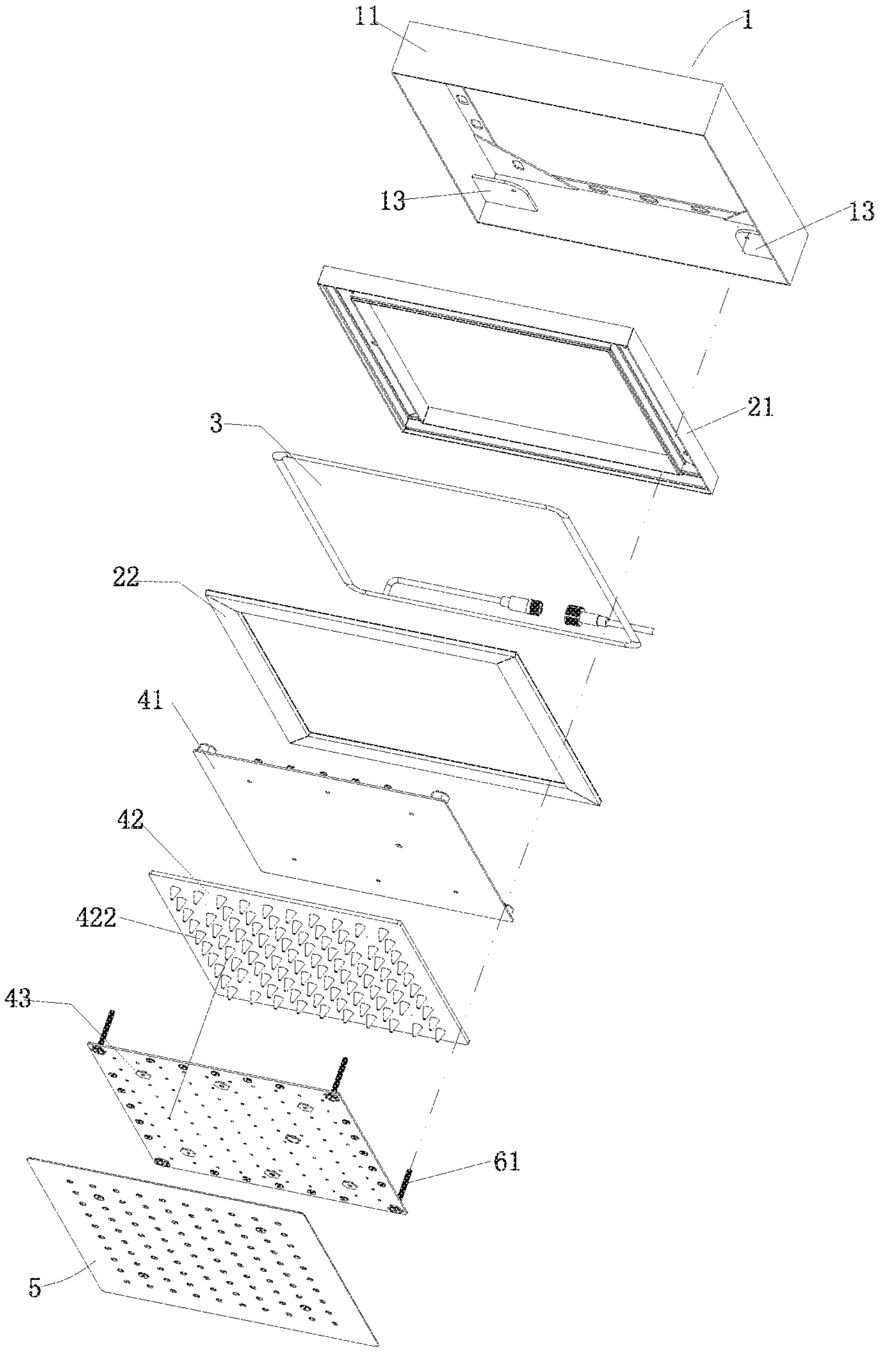
FIG. 4 is the second stereoscopic exploded view of the present utility model.
Figure 5:
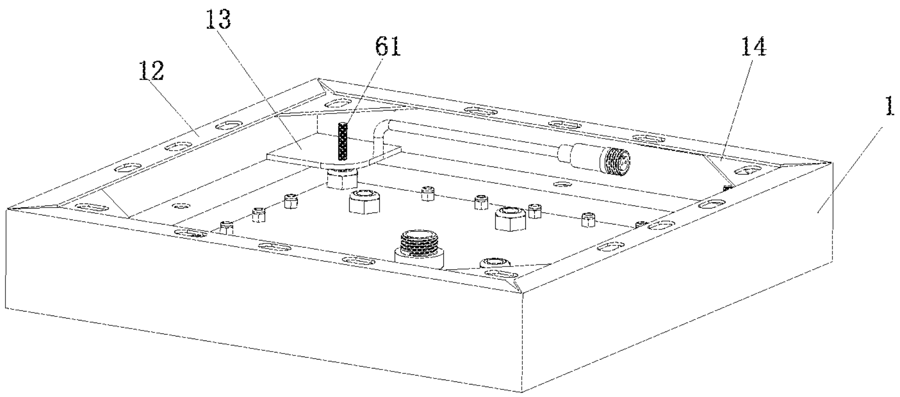
FIG. 5 is one of the stereoscopic diagrams of the present utility model.
Figure 6:
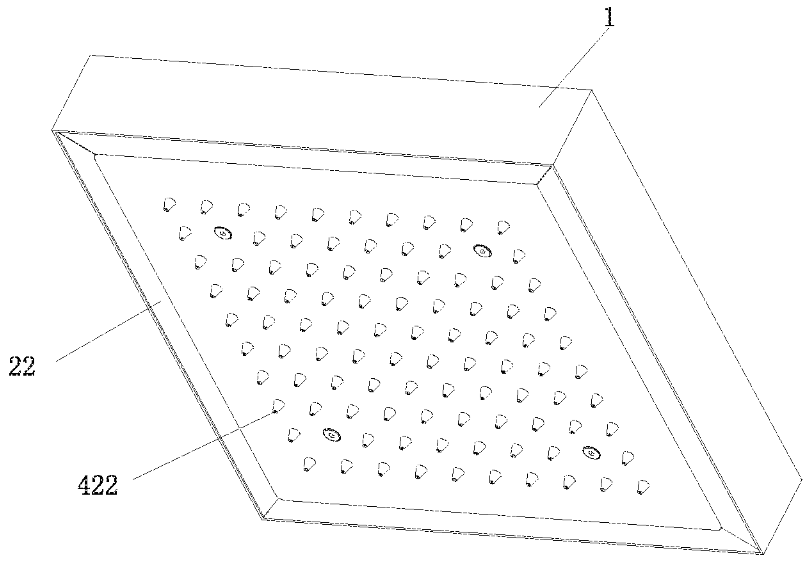
FIG. 6 is the second stereoscopic diagram of the present utility model.

The lamp body 2 includes a ring-shaped lamp shell 21 with a lower opening and a ring-shaped light-transmitting lamp cover 22. The light-transmitting lamp cover 22 is buckled to the lower opening of the lamp shell, and the lamp shell 21 is made of aluminum material, which has good heat dissipation function. The light-transmitting lamp cover is made of plastic; as shown in FIG. 3, the lamp shell 21 and the light-transmitting lamp cover 22 are square rings. Alternatively, the lamp shell 21 and the light-transmitting lamp cover 22 can be circular rings.

The shower head main body 4 and the water outlet panel 5 are square but can also be circular.

The circular LED light strip 3 is set on the top plate of the lamp shell 21, and the lamp body 2 is embedded in the lower part of the tubular body 11. The upper end fits with the fixing seat plate 13 for positioning; the shower head main body 4 is embedded in the central hole 23 of the lamp body 2 and fits with the fixing seat plate 13 for positioning. Long screws 61 pass through the corner of the shower head main body 4 and screw into the screw holes on the fixing seat plate 13, short screws 62 pass through the water outlet panel 5 and screw into the shower head main body 4. Because the tubular body 11 has an upper opening and the lamp shell 21 has good heat dissipation, the circular LED light strip 3 dissipates heat quickly, extending its service life. The circular LED light strip has a large light-emitting area, displays a running horse style light, and surrounds the water outlet position. The combination of water flow and light lines creates a good atmosphere.

The top ring seat plate 12 has a connecting hole 121, and the top plate of the lamp shell 21 has a screw hole 211; a screw passes through the connecting hole 121 and screws into the screw hole 211.

As a further improvement of the present utility model: the edge of the water outlet panel 5 supports the inner side of the lower surface of the lamp body 2.

As a further improvement of the present utility model: the circular LED light strip 3 is a 64-color LED light strip. Under the control of the LED driver, the colors rotate, providing a good atmosphere.

The circumferential wall plate of the tubular body 11 is provided with a heat dissipation hole 111. This further improves the heat dissipation performance.

The corner of the top ring seat plate 12 of the suspended ceiling frame 1 is provided with a strengthening plate 14, and the strengthening plate 14 has a suspension rope connection hole. This prevents deformation of the suspended ceiling frame and facilitates leveling adjustments during suspension.

The shower head main body 4 includes a top plate 41, a water spraying part 42, and a fixing panel 43.

The top plate 41 is provided with a water inlet interface 411.

The water spraying part 42 includes an open square cavity 421 and a water spray nozzle 422 located in the bottom plate. The water spray nozzle 422 is frustoconical.

The fixing panel 43 is provided with a nozzle hole.

The water outlet panel 5 is provided with a nozzle hole.

The top plate 41, water spraying part 42, and fixing panel 43 are stacked and fixed together, with the top plate 41 covering the upper opening of the square cavity 421 to form a sealed water inlet cavity. The water outlet panel 5 is attached to the fixing panel 43. The long screw 61 passes through the fixing panel 43, square cavity 42, and top plate 31. The short screw 62 passes through the water outlet panel 5, fixing panel 43, water spraying part 42, and screws into the top plate 43.

Although the embodiments of the present utility model have been shown and described, those skilled in the art will understand that: various changes, modifications, replacements, and alterations can be made to these embodiments without departing from the principles and objectives of the present utility model. The scope of this utility model is defined by the claims and their equivalents.

What is claimed is:

1. An embedded carousel ambient lighting shower comprising: a ceiling frame, a lamp body, an LED strip, a shower head main body and a water outlet panel;

the ceiling frame comprising a body with an upper and lower opening, a top ring seat board, and evenly distributed fixed seat boards;

the lamp body comprising a downwardly open annular lamp shell and an translucent lamp cover, the lamp shell is made of aluminum;

the annular LED strip is placed on the top plate of the lamp shell, and the lamp body is embedded in the lower part of the body;

the shower head main body is embedded in the center hole of the lamp body and cooperates with the fixed seat board for positioning; first-model screws pass through the shower head main body and are screwed into the fixed seat board; second-model screws passes through the water outlet panel and are screwed into the shower head main body.

2. The embedded carousel ambient light shower as claimed in claim 1, comprising: the water outlet panel having an edge and an inner side facing the shower head main body, the edge of the water outlet panel supports the inner side of the lower surface of the lamp body.

3. The embedded carousel ambient light shower as claimed in claim 1, comprising: the annular LED strip is a 64-color LED strip.

4. The embedded carousel ambient light shower as claimed in claim 1, comprising: heat dissipation holes on the circumferential wall panel of the cylindrical body.

5. The embedded carousel ambient light shower as claimed in claim 1, comprising: connection holes on the top ring seat board, and there are screw holes on the top plate of the lamp shell; screws pass through the connection holes and screw into the screw holes.

6. The embedded carousel ambient light shower as claimed in claim 1, comprising: the shower head main body includes a top plate, a water spray piece and a fixed panel;

a water inlet interface is provided on the top plate;

the water spray piece includes a square cavity with an upper opening and a water spray nozzle, and the fixed panel has a nozzle hole;

a nozzle hole is provided on the water outlet panel;

the top plate, the water spray piece and the fixed panel are superimposed and fixed, and the top plate covers the upper opening of the annular water chamber to form a water inlet chamber;

the water outlet panel is fitted with the fixed panel, the first-model screws pass through the fixed panel, the square cavity and the top plate, and the second-model screws pass through the water outlet panel, the fixed board, the water spray piece and are screwed into the top plate.

* * * * *